United States Patent [19]

Kasahara

[11] Patent Number: 4,623,947
[45] Date of Patent: Nov. 18, 1986

[54] MAGNETIC HEAD DEVICE

[75] Inventor: Akihiro Kasahara, Tokyo, Japan

[73] Assignee: Tokyo Shibaura Denki Kabushiki Kaisha, Kawasaki, Japan

[21] Appl. No.: 588,342

[22] Filed: Mar. 12, 1984

[30] Foreign Application Priority Data

Mar. 17, 1983 [JP] Japan .................................. 58-43097
Mar. 17, 1983 [JP] Japan .................................. 58-43098

[51] Int. Cl.⁴ ........................ G11B 5/58; G11B 21/24
[52] U.S. Cl. ................................................. 360/109
[58] Field of Search ........................... 360/109, 76, 77

[56] References Cited

U.S. PATENT DOCUMENTS 4,212,043 7/1980 Baker ................................. 360/109
4,392,163 7/1983 Rijckaert et al. ................... 360/109

FOREIGN PATENT DOCUMENTS 54-155802 12/1979 Japan.
56-74822 6/1981 Japan.

OTHER PUBLICATIONS

Mueller, "Magnetic ... Suspension", IBM Tech. Disc. Bull., vol. 19, No. 5, p. 1808, Oct. 1976.

Primary Examiner—Robert S. Tupper
Attorney, Agent, or Firm—Oblon, Fisher, Spivak, McClelland & Maier

[57] ABSTRACT

A magnetic head device including a set of parallel leaf springs, equal in length, whose proximal ends are fixed to a base, extending from the base in the running direction of a magnetic tape, a rigid plate for connecting the free ends of the parallel plate springs with each other, a magnetic recording/reproducing head fixed to the rigid plate and housed between the parallel plate springs, and a voice coil motor located between the base and the rigid plate to shift the rigid plate.

17 Claims, 12 Drawing Figures

MAGNETIC HEAD DEVICE

BACKGROUND OF THE INVENTION

The present invention relates to a magnetic head device for recording electric signals on a magnetic tape as magnetic signals and converting magnetic signals, which have already been recorded on the magnetic tape, to electric signals for reproduction, and more particularly, it relates to a magnetic head device suitable for use in the magnetic recording/reproducing apparatus of the pulse-code modulation type.

The demand for a compact cassette-type recorder of the pulse-code modulation (which will be hereinafter referred to as PCM) type has rapidly risen recently. In the case of this PCM type compact cassette-type recorder, the number of tracks on the magnetic tape must be increased to about 18 to 36 to raise the magnetic recording density per a predetermined length of the magnetic tape in a compact cassette. When the number of tracks is increased like this, however, the width of one track will become 100 to 200 μm. Therefore, the real width for recording will become narrower, ranging from 50 μm to 100 μm, since it is obtained by subtracting the guard band from the width of one track.

In the case where magnetic signals, recorded on an actual recording track which ranges from about 50 μm to 100 μm, are converted to electric signals for reproduction by means of the magnetic reproducing head in the compact cassette-tape recorder, tracking error of the actual recording track on the magnetic tape, relative to the gap of the magnetic reproducing head, must be held to an extremely small range, for example, a maximum of less than 20 μm.

The following two measures are supposedly used for reducing the tracking error of a magnetic tape.

The first uses a tape guide of the conventional type to track the magnetic tape, relative to the gap of the magnetic reproducing head. Since the tracking error allowed in this case is extremely small, ranging 20 μm at maximum, and manufacture and assembly of the tape guide must be done with extremely high accuracy, the manufacturing cost of the compact cassette-tape recorder is extremely high. In addition, the magnetic tape is forcibly tracked by the tape guide and thus likely to be damaged by its sliding contact with the tape guide. Further, a fatal drawback, caused when employing the first measure, is that the tracking adjustment of the tape guide is almost meaningless, even if the tracking of the magnetic tape can achieve a high level of accuracy the point of view of manufacture and assembly of the tape guide, because the width of a magnetic tape in the commercially-available compact cassette is determined to range from 3.81 mm to 3.76 mm, according to the standard and manufacturing maximum tolerance of 50 μm allowed in the width of the magnetic tape itself.

In contrast, the second measure causes the magnetic reproducing head to follow an actual recording track of the magnetic tape. An example of using this second measure is the well-known head moving device disclosed in Japanese Patent Disclosure No. 56-74822. The well-known head moving device comprises a base, a pair of parallel leaf springs whose proximal ends are fixed to the base, a magnetic recording/reproducing head attached to the distal ends of these parallel leaf springs, and displacing means for displacing the paired parallel leaf springs which oscillatingly move the magnetic recording/reproducing head to follow the magnetic tape or the waving of its actual recording track.

In the case of the above-described head moving device, the parallel leaf springs extend perpendiclar to the direction in which the magnetic tape runs, and contact pressure, which is added to the head surface of the magnetic recording/reproducing head because of tension of the magnetic tape and pad pressure is therefore transmitted to the parallel leaf springs through the magnetic recording/reproducing head. In short, the contact pressure acts as compression force on the parallel leaf springs from the distal ends to the proximal ends thereof. When the parallel leaf springs are displaced so as to follow the waving of the magnetic tape, buckling of the parallel leaf springs is thus likely to be caused by the compression force. Therefore even if the displacement of the parallel leaf springs is controlled by the displacing means to follow a shift which corresponds to the waving of the actual recording track on the magnetic tape so as to achieve the tracking of the magnetic recording/reproducing head, the head will fail to achieve the high accurate tracking due to the fact that the buckling of the parallel leaf springs may occur by the compression force. This means that displacing force, added to the parallel plate springs from the displacing means, is not linearly proportional to the displacement of the parallel plate springs caused by the displacing force.

In order to prevent the buckling of the parallel leaf springs, it is supposed that the thickness of each of the parallel leaf springs is increased and that the stiffness of the parallel leaf springs is thus risen. If so made, however, a large and strong displacing means is needed to displace the parallel leaf springs, thus increasing the cost of the magnetic head device and increasing the weight of the whole magnetic head device due to increase the weight of the parallel leaf springs and displacing means. In other words, when stiffness relative to the displacement of the parallel leaf springs is determined, stiffness relative to the compression force is also determined unconditionally, thus making it impossible to freely design the magnetic head device.

Further, the magnetic recording/reproducing head and the parallel leaf springs are connected to each other in a series in the head moving device, thus making the whole of the head moving device large.

SUMMARY OF THE INVENTION

The object of the present invention is to provide a compact magnetic head device, embodied by improving the conventional device according to the above-mentioned second measure, simpler in construction, capable of achieving highly accurate tracking control, and being free in designed.

This object can be achieved by a magnetic head device comprising a base; a pair of parallel plate portions whose one ends are attached to the base and which extend in the running direction of a magnetic tape, the parallel plate portions being equal in length and each displaceable, taking the one end thereof as a fulcrum; a rigid portion for connecting the other ends of the parallel plate portions with each other, whereby the distance between the other ends of the parallel plate portions being equal to that between the one ends of the parallel plate portions; a magnetic head fixed on the rigid portion, the magnetic head facing the tape surface of the magnetic tape; and actuating means for displacing the rigid portion in a direction where the parallel place portions can shift.

According to the present invention, the parallel plate portions extend in the running direction of the magnetic tape, contact pressure between the magnetic tape and the magnetic head acts in the width direction of each of the parallel plate portions via the magnetic head. Therefore, the contact pressure will not create such a compression force as to cause the parallel plate portions to buckle. As a result, the contact pressure has no influence on the displacement of the parallel plate portions which follow the waving magnetic tape, that is, to the tracking operation of the magnetic head, thus enabling the magnetic head to attain highly accurate tracking.

Since the contact pressure does not create a compression force that causes the parallel plate portions to buckle, as described above, stiffness relative to the displacement of the parallel plate portions and stiffness of the parallel plate portions necessary to completely accept the contact pressure can be selected independent of one another by appropriately determining the width and thickness of the parallel plate portions, thus guaranteeing more freedom of design.

Further, according to an another aspect of the present invention, the magnetic head is fixed to the rigid portion so as to be housed between the parallel plate portions, thus enabling the size of the whole magnetic head device to be reduced.

BRIEF DESCRIPTION OF THE DRAWINGS

This invention can be more fully understood from the following detailed description when taken in conjunction with the accompanying drawings, in which.

DETAILED DESCRIPTION OF THE PREFERRED EMBODIMENTS

Figure 1:
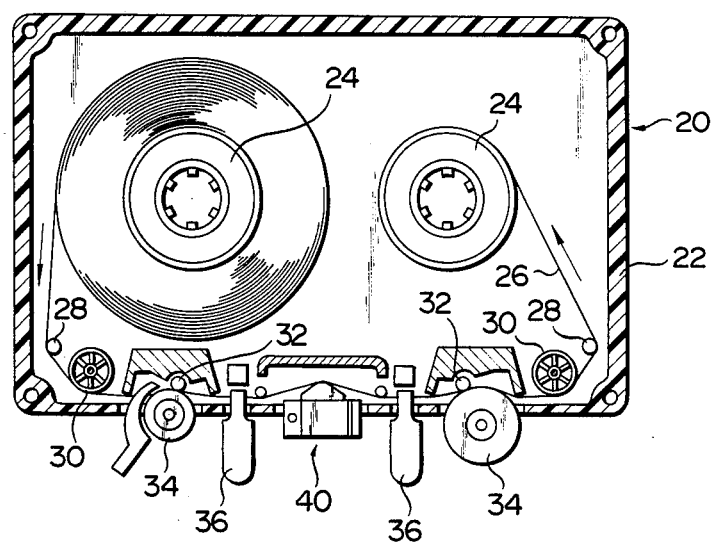
FIG. 1 is a schematic sketch showing the relationship between a first embodiment of the magnetic head device according to the present invention and a compact cassette.

Referring to FIG. 1, roughly shown is the relationship between a compact cassette 20 and a part of a PCM type compact audio-cassette tape recorder in which the first embodiment of a magnetic head device 40, according to the present invention, is included. The compact cassette 20 has a pair of shells 22 and only one of them is shown in FIG. 1. A pair of reels 24 are rotatably arranged in the shells 22. A magnetic tape 26 is stretched between the reels 24 in such a way that it is wound by one of the reels 24 while unwound from the other. When the magnetic tape 26 runs from one of the reels 24 to the other, in a direction shown by arrows in FIG. 1 for example, it is guided by guide pins 28, guide rollers 30, capstans 32, and the like. Arranged on the side of the compact cassette-tape recorder are pinch rollers 34, each contactable with each of the capstans 32, usual tape guides 36, the magnetic head device, and the like.

Figure 2:
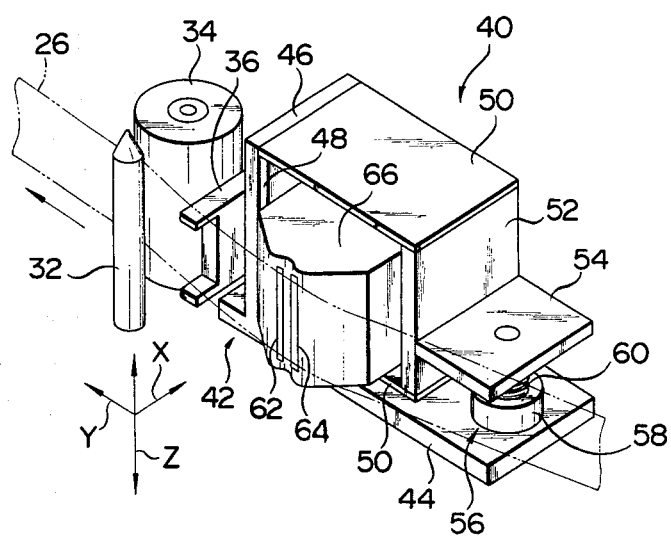
FIG. 2 is a perspective view showing the magnetic head device in FIG. 1.
Figure 3:
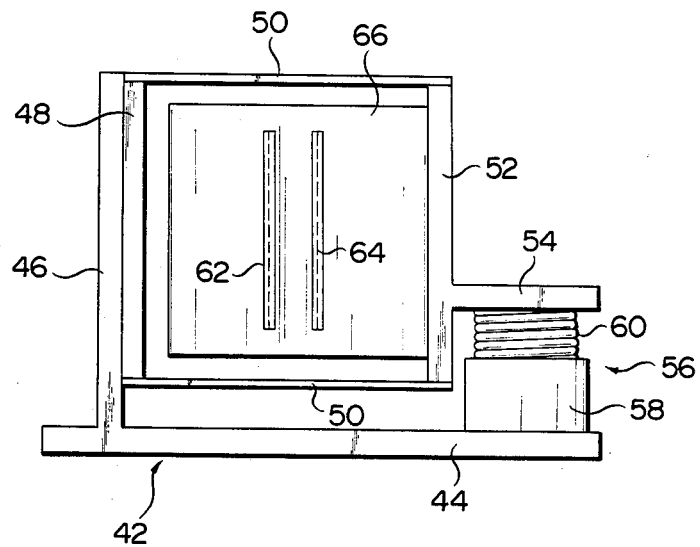
FIG. 3 is a front view showing the magnetic head device in FIG. 1.

Referring to FIGS. 2 and 3, an enlarged scale of the magnetic head device 40 is shown. The magnetic head device is provided with a base 42. The base 42 is fixed to the body (not shown) of a compact cassette-tape recorder and it has a base plate portion 44, extending in the running direction of the magnetic tape 26, and a stand plate portion 46, formed integrally and adjacently to one end of the base plate portion 44 and crossing the running direction of the magnetic tape 26.

A pair of parallel leaf springs 50, equal in length, are fixed to the stand plate portion 46 of the base 42, at the proximal ends thereof, with a fixing plate 48 interposed between them. The parallel leaf springs 50 extend substantially parallel to the base plate portion 44 of the base 42 (and so are parallel to the tape running direction) and are separated from each other to form a predetermined interval between them in the width direction of the magnetic tape 26.

The free ends of the parallel leaf springs 50 are connected with each other by a rigid plate 52, which is aligned opposite and parallel to the stand plate portion 46 of the base 42 and spaced therefrom in said running direction. Therefore, the distance between the proximal ends of the parallel leaf springs 50 is equal to that between the free ends of the parallel leaf springs 50. A bracket portion 54, integral to the rigid plate 52, extends outward and substantially parallel to the base plate portion 44 of the base 42.

A voice coil motor 56 is located betwteen the bracket portion 54 of the rigid plate 52 and the base plate portion 44 of the base 42. The voice coil motor 56 comprises a magnetic element 58 fixed on the base plate portion 44 of the base 42, and a voice coil 60 whose one end is fixed to the bracket portion 54 of the rigid plate 52 and which encloses the magnet and pole piece of the magnet element 58. The voice coil motor 56 is electrically connected to a drive circuit (not shown).

Facing the tape surface of the magnetic tape 26, a magnetic recording/reproducing head 66, provided with elongated recording and reproducing gaps 62 and 64 which are spaced in the tape running direction, is fixed to that inner face of the rigid plate 52 which is opposed to the fixing plate 48. More specifically, the magnetic recording/reproducing head 66 is housed in a space which is defined by the parallel leaf springs 50, rigid plate 52, and fixing plate 48, as shown in FIGS. 2 and 3.

When the compact cassette 20 is loaded in the compact cassette tape recorder, the magnetic tape 26 in the compact cassette 20 is brought into contact with the head surface of the magnetic recording/reproducing head 66. At the same time, the magnetic tape 26 is pinched between a set of the capstan 32 and pinch roller 34, respectively, and is ready to be guided by the tape guides 36. In a case where the magnetic tape 26 is run to convert magentic signals, which have already been recorded on actual recording tracks 26a (see FIG. 5) of the magnetic tape 26, into electrical signals for reproduction, the magnetic recording/reproducing head 66 is moved in the direction of elongation of the gaps 62 and 64 to follow the waving caused by the running of the magnetic tape 26 or its actual recording tracks 26. More specifically, when the voice coil motor 56 is driven, responding to the amount of waving of the actual recording tracks 26a, the voice coil motor 56 tries to move the bracket portion 54 of the rigid plate 52 toward the waving direction of the magnetic tape 26, shown by an arrow Z in FIG. 2. Since the rigid plate 52 connects the free ends of the paired parallel leaf springs 50, these parallel leaf springs 50 are deflected in this case as if they swung around their proximal ends, thereby causing the rigid plate 52 to be moved and shifted parallel to the fixing plate 48 or substantially in the direction Z. As a result, the magnetic recording/reproducing head 66 fixed to the rigid plate 52 is also tracking, shifted only by the waving amount of the actual recording tracks 26a in the direction Z.

Optical detection of the waving of one edge of the magnetic tape 26 is supposed, for example, as a method of detecting the waving amount of actual recording tracks 26a of the magnetic tape 26.

Figure 4:
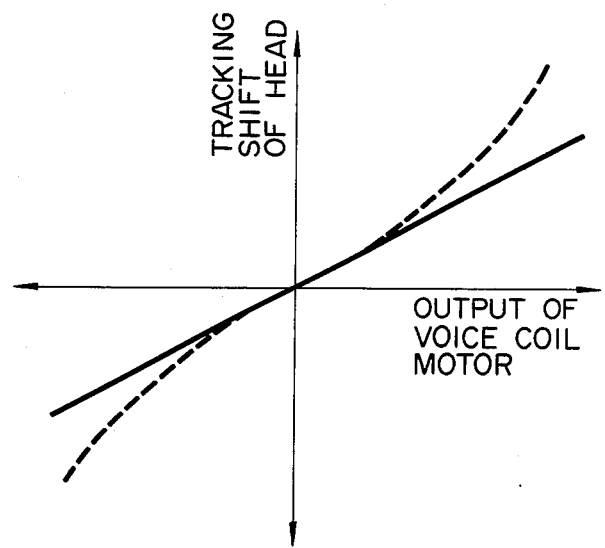
FIG. 4 is a graph showing the tracking shift characteristic of the magnetic recording/reproducing head.

As shown in FIGS. 2 and 3, according to the first embodiment of the magnetic head device, the parallel leaf springs 50 extend in the direction the magnetic tape 26 runs. Even if tension of the magnetic tape 26 and pad pressure acted on the magnetic tape 26 is added, as contact pressure acting in a direction X in FIG. 2, to the magnetic recording/reproducing head 66, the contact pressure will not act as a compression force to buckle the parallel leaf springs 50. (Pads are not shown in Figs.) As the result, the amount of shifting of the magnetic recording/reproducing head 66 in the direction Z corresponds to output of the voice coil motor 56 by a proportion of 1 to 1, as shown by the solid line in FIG. 4. The broken line in FIG. 4 represents a magnetic head shifting characteristic curve of a prior art.

Figure 5:
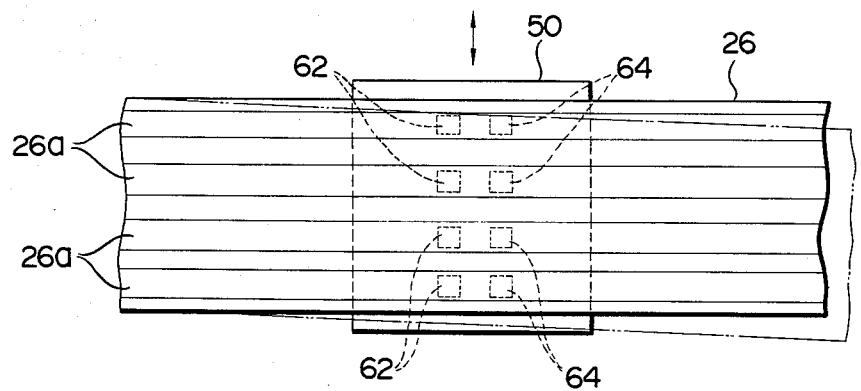
FIG. 5 is a view intended to explain the tracking operation of the magnetic recording/reproducing head.
Figure 6:
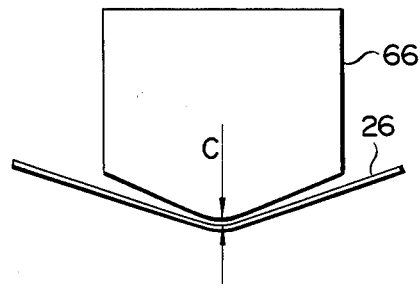
FIG. 6 is a view showing a spacing loss between the magnetic recording/reproducing head and a magnetic tape.

The magnetic recording/reproducing head 66, therefore can be shifted in the direction Z to follow the waving of the magnetic tape 26, shown by a virtual line in FIG. 5, thereby enabling the magnetic recording/reproducing head 66 to achieve highly accurate tracking. For the sake of clarity, the magnetic tape 26 is provided with four actual recording tracks 26a in FIG. 5. Because no force buckles parallel leaf springs 50, the tension and pad pressure of the magnetic tape 26, which acts on the head surface of the magnetic recording/reproducing head 66, can be enlarged. As a result, no spacing loss C, as shown in FIG. 6, will be caused between the head surface of the magnetic recording/reproducing head 66 and the magnetic tape 26.

According to the first embodiment of the magnetic head device 40, stiffness of the parallel leaf springs 50 relative to the swing and shift and their stiffness relative to the contact pressure can be determined independently by selecting the thickness and width of each of them, thereby guaranteeing more freedom of design.

Further, the size of the magnetic head device 40 can be small because the magnetic recording/reproducing head 66 is housed in the space which is enclosed by the parallel leaf springs 50, rigid plate 52, and fixing plate 48.

Figure 7:
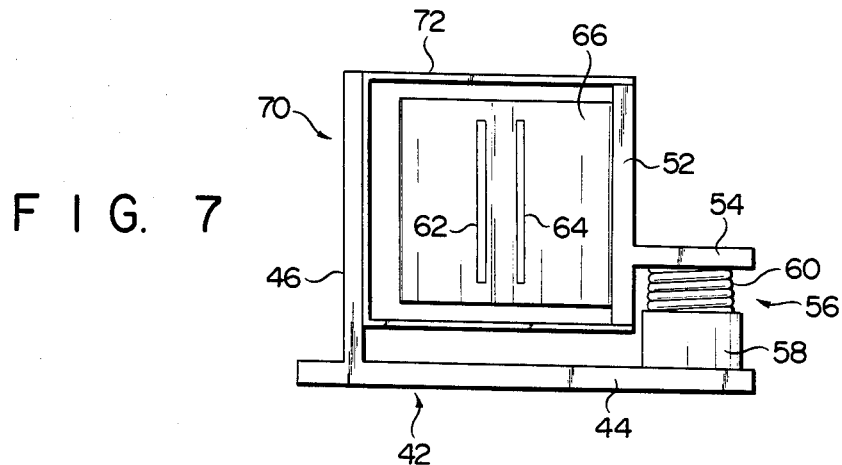
FIGS. 7 through 9 show modifications of the magnetic head device in FIG. 1.
Figure 8:
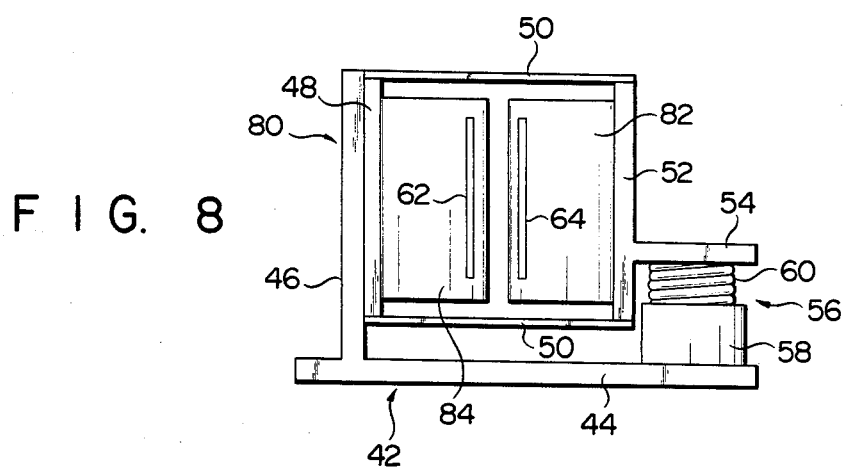
Figure 9:
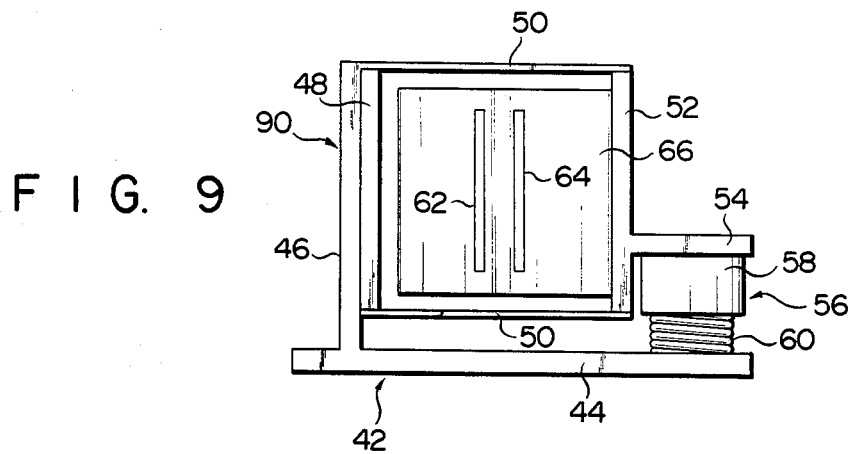

It should be understood that the present invention is not limited to the first embodiment of magnetic head device. Modifications of the first magnetic head device 40 will be described referring to FIGS. 7 through 9. In FIGS. 7 to 9, members which have same function as those of the first embodiment will be represented by the same reference numerals, and description on these members will be omitted.

According to the magnetic head device 70 shown in FIG. 7, a channel section spring plate 72 is employed instead of the parallel leaf springs 50 and fixing plate 48. The number of parts which form the magnetic head device 70 can be thus decreased to enhance productivity.

In the case of the magnetic head device 80 shown in FIG. 8, a magnetic reproducing head 82 is fixed to the rigid plate 52 while a magnetic recording head 84 is fixed to the fixing plate 48, instead of using the integral magnetic recording/reproducing head 66. Since the magnetic recording head 84 is fixed to the fixing plate 48, that is, to the base 42, the waving of the actual recording tracks 26a, which is caused by the unsteadiness of the magnetic recording head 84 at the time of recording, can be prevented.

According to the magnetic device 90 shown in FIG. 9, the magnetic element 58 of the voice coil motor 56 is fixed to the bracket portion 54 of the rigid plate 52, while the voice coil 60 of the voice coil motor 56 is fixed to the base plate portion 44 of the base 42. Since the voice coil 60 can be assembled to the fixing members, its assembly becomes easier and enhance productivity.

Figure 10:
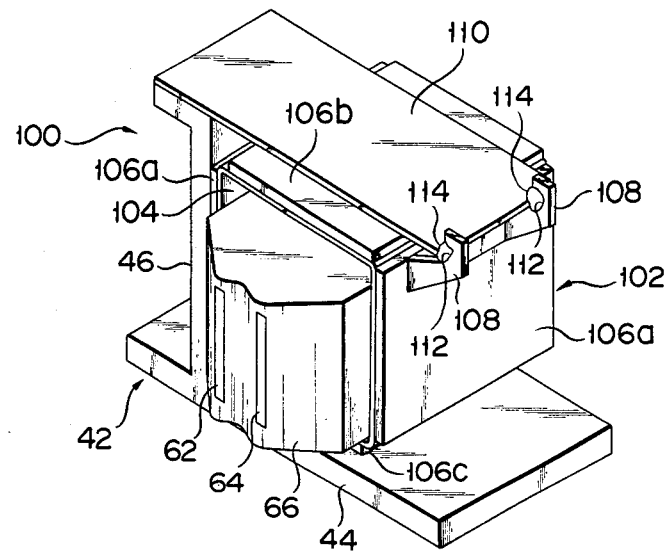
FIG. 10 is a perspective view showing a second embodiment of the magnetic head device according to the present invention.

It should also be understood that the present invention is not limited to the first embodiment of the magnetic head device 40 and its modifications. A second embodiment of magnetic head device according to the present invention will be described referring to FIGS. 10 and 11. Members of the second embodiment which have the same function as those of the first embodiment will be represented by same reference numerals and description on these members will be omitted.

Figure 11:
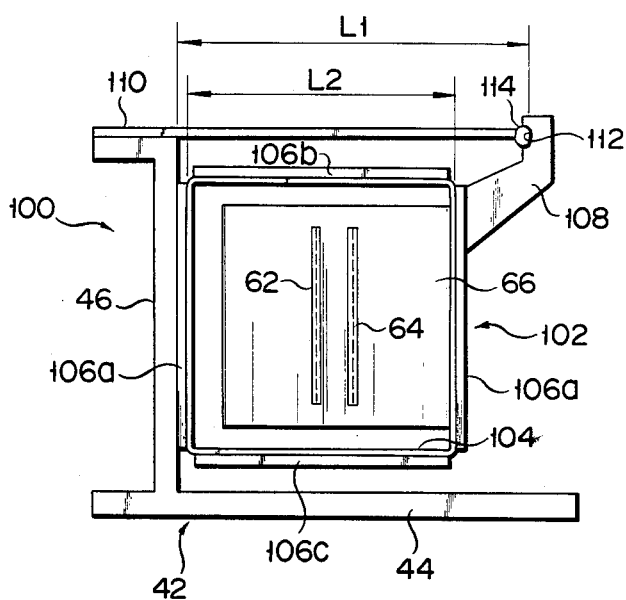
FIG. 11 is a front view showing the magnetic head device in FIG. 10.

In the case of the second embodiment of a magnetic head device 100 according to the present invention, parts 102 which correspond to the fixing plate 48, parallel leaf springs 50, and rigid plate 52 in the first magnetic head device 40 comprise a rectangular (including square) flexible film 104 made of synthetic resin, and four reinforcing plates 106a, 106b, 106c and 106d bonded to the four sides of the flexible film 104 in such a manner that the four corners of the flexible film 104 are uncovered. As shown in FIG. 11, the parts 102 are a quadric link chain wherein the four corners of the parts 102 are formed as hinges. When one 106a of the reinforcing plates bonded to one sides of the parts 102 is fixed to the stand plate portion 46 of the base 42, a side set of parallel reinforcing plates 106b and 106c, which cross said one side and which extend in the running direction of the magnetic tape 26, can swing and shift taking their hinges, which are adjacent to the stand plate portion 46 of the base 42, as fulcrums.

Similarly to the first magnetic head device 40, the magnetic recording/reproducing head 66 is fixed to the inner surface of that side of the parts 102 which is opposite to said one side thereof.

A pair of upwardly extending arms 108 are attached to the outer surface of the reinforcing plate 106d on that side of the parts 102 to which the magnetic recording/reproducing head 66 is fixed. These arms 108 and the stand plate portion 46 of the base 42 are connected with each other by means of a bimorph plate 110. The bimorph plate 110 is fixed at one end thereof to the stand plate portion 46 of the base 42, extending parallel to the reinforcing plate 106b which is perpendicular to the stand plate portion 46, while the other end of the bimorph plate 110 is bonded with flexible bond 114 of the silicone type to cutaway portions 112 of the arms 108.

The bimorph plate 110 includes two piezoelectric plates cemented together in such way that voltage applied causes one of the piezoelectric plates to expand while the other to contract, so that the bimorph plate 110 bends in proportion to the voltage applied. The bimorph plate 110 is electrically connected to a driver circuit (not shown), which serves to apply voltage to both ends of the bimorph plate 110 according to the waving amount of the actual recording tracks 26a of the magnetic tape 26.

Providing the length of the bimorph plate 110 is $L_1$, and the length of that side of the parts 102 which is parallel to the bimorph plate 110 is denoted by $L_2$, as shown in FIG. 11, $L_1/L_2$ becomes equal to 1.17–1.5.

According to the second embodiment of the magnetic head device, voltage is applied to both ends of the bimorph plate 110 in response to the amount of waving of the actual recording tracks 26a of the magnetic tape 26, so that the bimorph plate 110 may be bent to swing and shift the set of sides of the parts 102 which are parallel to the bimorph plate 110. In short, similar to the case in the first embodiment, it is also apparent in the case of the second embodiment that tracking control of the magnetic recording/reproducing head 66 can be achieved with same effects as those attacined by the first embodiment.

Since all of the forces based on the weight of the magnetic recording/reproducing head 66, tape tension of the magnetic tape 26 and like are borne by the parts 102, the load acting on the bimorph plate 110 is small. Therefore, a relatively thin bimorph plate 110 can be made, and its whole length can be shortened as it is made thinner, thus enabling the whole of the magnetic head device 100 to be further reduced.

Since the ratio $L_1/L_2$ is to be within a range of 1.17–1.5, in the case of the second embodiment, the shifting amount of the distal end of the bimorph plate 110 in the directions Z and Y becomes substantially equal to that of the distal ends of those sides of the parts 102 which are parallel to the bimorph plate 110, and bending of the bimorph plate 110 is not, therefore, prevented by the parts 102.

Figure 12:
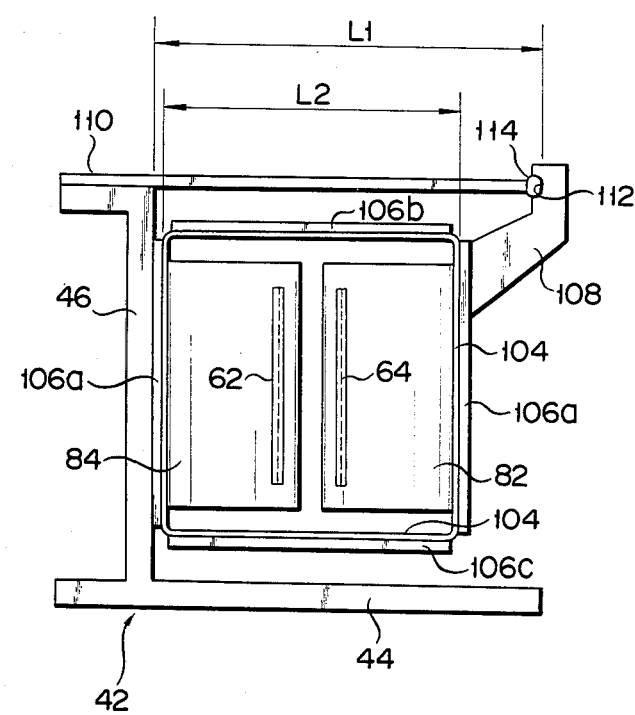
FIG. 12 shows a modification of the magnetic head device in FIG. 10.

FIG. 12 shows a modification of the second embodiment. Similar to the modification shown in FIG. 8, as a modification of the first embodiment, a magnetic reproducing head 82 and a magnetic recording head 84 are employed instead of the magnetic recording/reproducing head 66.

It should be understood that the present invention can be applied to the magnetic video head device in the video tape recorder as well as to the magnetic head device in the compact audio cassette-tape recorder.

What is claimed is:

1. A magnetic head device comprising:
   a base;
   a magnetic head having parallel elongated recording and reproducing gaps which are mutually spaced in a first direction parallel to a running direction of a magnetic tape between said gaps and positioned for facing the tape surface of said magnetic tape;
   a pair of resilient parallel plate portions having one end attached to a portion of said base, said parallel plate portions extending parallel to said first direction to other ends of said parallel plate portions, said parallel plate portions being equal in length and each being shaped so as to be displaceable in the direction of elongation of said gaps, taking said one end thereof as a fulcrum;
   a rigid portion connecting said other ends of said parallel plate portions with each other, said base portion and rigid portion being aligned in said first direction, said magnetic head being fixed to said rigid portion, whereby the distance between the other ends of the parallel plate portions is equal to that between the one ends of the parallel plate portions; and
   actuating means for displacing said rigid portion in said direction of elongation whereby said parallel plate portions can shift.

2. A magnetic head device, according to claim 1, wherein said rigid portion is a rigid plate.

3. A magnetic head device, according to claim 1, wherein said parallel plate portions are a pair of parallel leaf springs.

4. A magnetic head device, according to claim 3, wherein the one ends of said parallel leaf springs are fixed to the base through a fixing plate portion.

5. A magnetic head device, according to claim 1, wherein said parallel plate portions are comprised by a leaf spring which having a pair of parallel leaf portions and a perpendicular leaf portion which is perpendicular to the parallel leaf portions, the perpendicular leaf portion connecting one ends of the parallel leaf portions with each other.

6. A magnetic head device, according to claim 5, wherein the perpendicular leaf portion is fixed directly to said base.

7. A magnetic head device, according to claim 1, wherein said parallel plate portions and rigid portion form part of a quadratic link chain in which one link of said quadratic link chain is fixed to said base portion and in which said parallel plate portions for links opposite to each other are equal in length.

8. A magnetic head device, according to claim 7, wherein the quadric link chain comprises a flexible film formed substantially as a rectangle, and reinforcing plates fixed to the four sides of the flexible film in a such a manner that the four corners of the flexible film are uncovered.

9. A magnetic head device according to claim 1, wherein said base has a base plate portion extending parallel to said parallel plate portions; said actuating means includes a voice coil motor located between the base plate portion and a bracket portion extending outward from said rigid portion and parallel to the base plate portion.

10. A magnetic head device, according to claim 9, wherein a magnet element of the voice coil motor is fixed to the base plate portion of said base, and one end of a voice coil of the voice coil motor is connected to the bracket portion of said rigid portion.

11. A magnetic head device, according to claim 9, wherein a magnet element of the voice coil motor is fixed to the bracket portion of said rigid portion, and one end of a voice coil of the voice coil motor is connected to the base plate portion of said base.

12. A magnetic head device, according to claim 1, wherein said actuating means includes a bimorph plate, one end of which is fixed to said base, extending parallel to said parallel plate portions, and the other end of which is attached to said rigid portion through fixing members.

13. A magnetic head device, according to claim 12, wherein length $L_1$ of the bimorph plate and length $L_2$ of said parallel plate portions are determined to form a ratio ($L_1/L_2$) ranging from 1.17 to 1.5.

14. A magnetic head device, according to claim 1, wherein said magnetic head is a magnetic recording/reproducing head.

15. A magnetic head device, according to claim 14, wherein the magnetic recording/reproducing head is housed in a space which is defined by said parallel plate portions, rigid portion, and said base.

16. A magnetic head device, according to claim 1, wherein said magnetic head is a magnetic reproducing head and further includes a magnetic recording head.

17. A magnetic head device, according to claim 16, wherein the magnetic reproducing head is housed in a space which is defined by said parallel plate portions, rigid portion, and said base, the magnetic recording head is fixed to said base so as to be housed into the space.

* * * * *